United States Patent
Mckeen et al.

(10) Patent No.: US 9,323,686 B2
(45) Date of Patent: Apr. 26, 2016

(54) PAGING IN SECURE ENCLAVES

(71) Applicant: Intel Corporation, Santa Clara, CA (US)

(72) Inventors: Francis X. Mckeen, Portland, OR (US); Michael A. Goldsmith, Lake Oswego, OR (US); Barry E. Huntley, Hillsboro, OR (US); Simon P. Johnson, Beaverton, OR (US); Rebekah Leslie, Portland, OR (US); Carlos V. Rozas, Portland, OR (US); Uday R. Savagaonkar, Portland, OR (US); Vincent R. Scarlata, Beaverton, OR (US); Vedvyas Shanbhogue, Austin, TX (US); Wesley H. Smith, Raleigh, NC (US); Ittai Anati, Haifa (IL); Ilya Alexandrovich, Haifa (IL); Alex Berenzon, Zikhron Ya'akov (IL); Gilbert Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 13/729,277

(22) Filed: Dec. 28, 2012

(65) Prior Publication Data

US 2014/0189325 A1 Jul. 3, 2014

(51) Int. Cl.
*G06F 12/00* (2006.01)
*G06F 12/08* (2016.01)
*G06F 9/30* (2006.01)

(52) U.S. Cl.
CPC ........ *G06F 12/0875* (2013.01); *G06F 9/30047* (2013.01)

(58) Field of Classification Search
CPC .......................... G06F 12/0882; G06F 12/1408
See application file for complete search history.

(56) References Cited

U.S. PATENT DOCUMENTS

| 2005/0100163 | A1  | 5/2005  | Buer |
| 2007/0277223 | A1  | 11/2007 | Datta et al. |
| 2011/0307651 | A1* | 12/2011 | Wong ............................ 711/103 |
| 2012/0159184 | A1  | 6/2012  | Johnson et al. |
| 2012/0163589 | A1  | 6/2012  | Johnson et al. |

FOREIGN PATENT DOCUMENTS

| WO | 2010/057085 A2 |   | 5/2010 |
| WO | WO 2011/078855 | * | 6/2011 |
| WO | 2014/105159 A1 |   | 7/2014 |

OTHER PUBLICATIONS

International Search Report and Written Opinion received for PCT Patent Application No, PCT/US20131047322, mailed on Oct. 16, 2013, 11 pages.
International Preliminary Report on Patentability received for PCT Patent Application No. PCT/US2013/047322, mailed on Jul. 9, 2015, 8 pages.

* cited by examiner

*Primary Examiner* — Gurtej Bansal
(74) *Attorney, Agent, or Firm* — Thomas R. Lane

(57) ABSTRACT

Embodiments of an invention for paging in secure enclaves are disclosed. In one embodiment, a processor includes an instruction unit and an execution unit. The instruction unit is to receive a first instruction. The execution unit is to execute the first instruction, wherein execution of the first instruction includes evicting a first page from an enclave page cache.

16 Claims, 3 Drawing Sheets

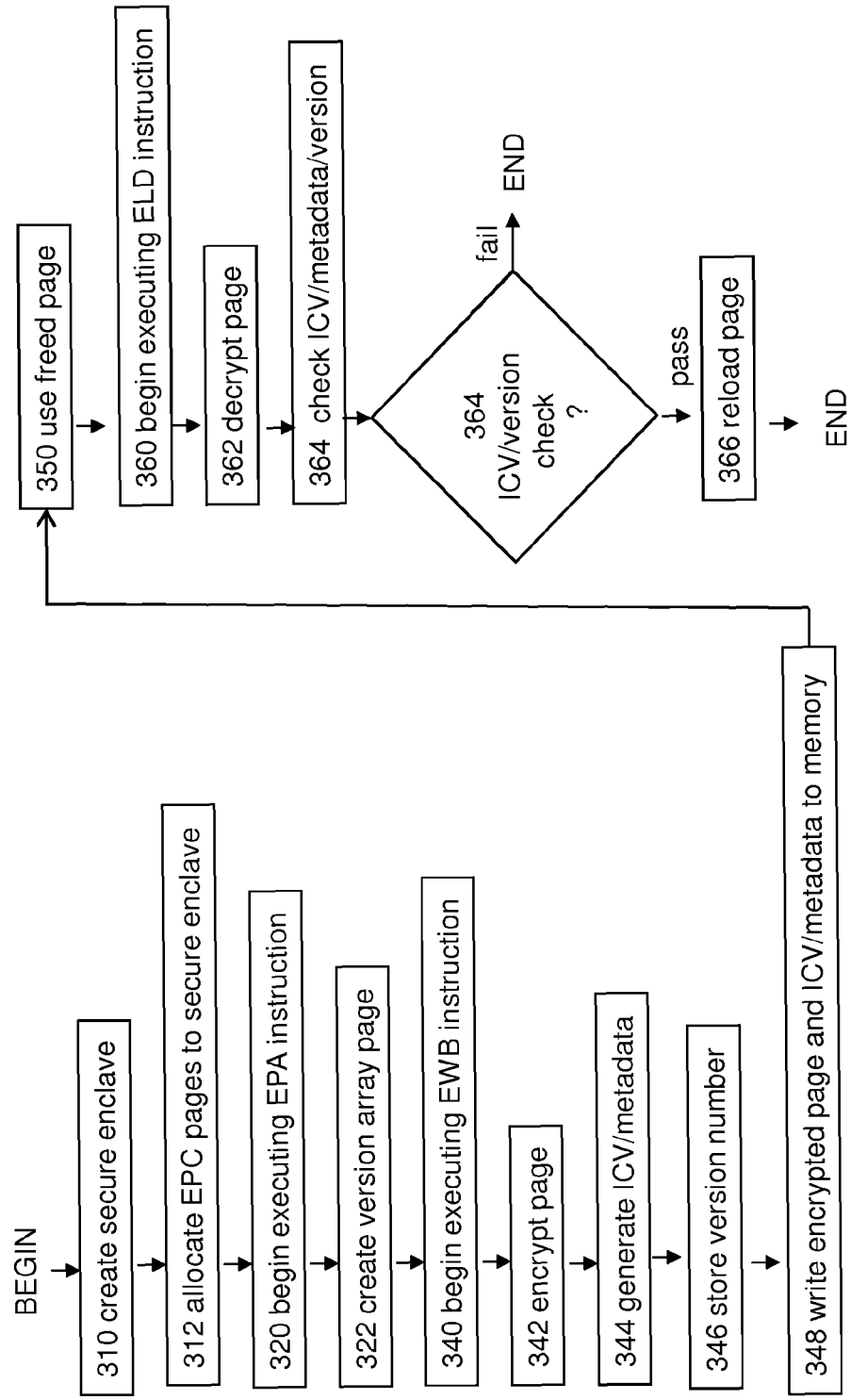

PAGING IN SECURE ENCLAVES

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated partition or environment within an information processing system.

BRIEF DESCRIPTION OF THE FIGURES

The present invention is illustrated by way of example and not limitation in the accompanying figures.

FIG. 3 illustrates a method for paging in secure enclaves according to an embodiment of the present invention.

DETAILED DESCRIPTION

Embodiments of an invention for paging in secure enclaves are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

As described in the background section, various approaches to creating and maintaining a secured, protected, or isolated partition or environment within an information processing system have been developed. One such approach involves secure enclaves as described in the co-pending U.S. patent application entitled "Method and Apparatus to Provide Secure Application Execution," filed Jun. 19, 2012, Ser. No. 13/527,547, which is hereby incorporated by reference as an example of at least one embodiment of a secure enclave. However, the incorporated reference is not intended to limit the scope of embodiments of the invention in any way and other embodiments may be used while remaining within the spirit and scope of the invention.

Figure 1:
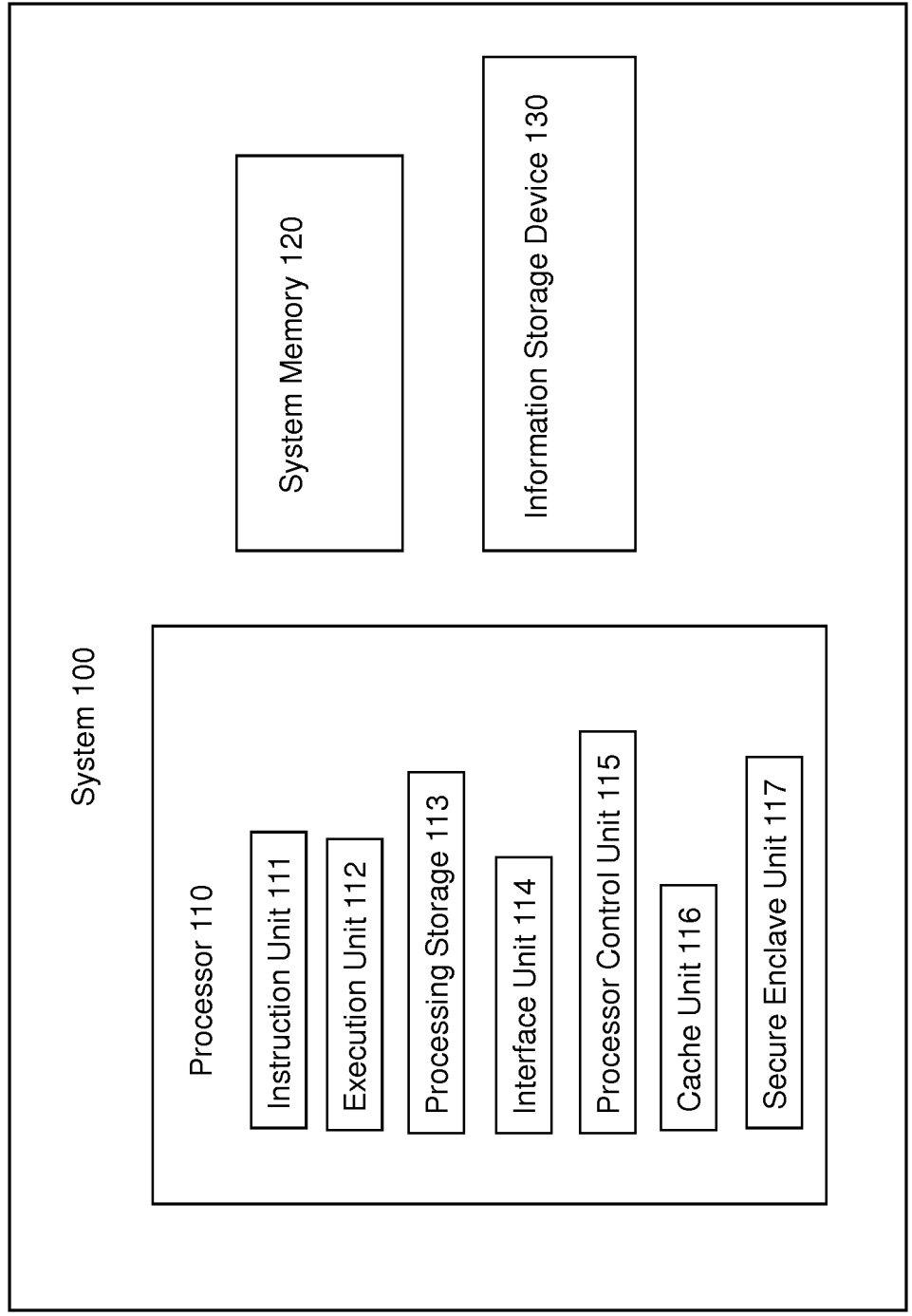
FIG. 1 illustrates a system including paging in secure enclaves according to an embodiment of the present invention.

FIG. 1 illustrates system 100, an information processing system including paging in secure enclaves according to an embodiment of the present invention. System 100 may represent any type of information processing system, such as a server, a desktop computer, a portable computer, a set-top box, a hand-held device, or an embedded control system. System 100 includes processor 110, system memory 120, and information storage device 130. Systems embodying the present invention may include any number of each of these components and any other components or other elements, such as information storage devices, peripherals, and input/output devices. Any or all of the components or other elements in this or any system embodiment, may be connected, coupled, or otherwise in communication with each other through any number of buses, point-to-point, or other wired or wireless interfaces or connections, unless specified otherwise.

System memory 120 may be dynamic random access memory or any other type of medium readable by processor 110. Information storage device 130 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. Processor 110 may include instruction unit 111, execution unit 112, processing storage 113, interface unit 114, processor control unit 115, cache unit 116, and secure enclave unit 117. Processor 110 may also include any other circuitry, structures, or logic not shown in FIG. 1, and/or any circuitry, structures, or logic shown or described as elsewhere in FIG. 1.

Instruction unit 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 112.

Execution unit 112 may include any circuitry, structure, or other hardware, such as an arithmetic unit, logic unit, floating point unit, shifter, etc., for processing data and executing instructions, micro-instructions, and/or micro-operations.

Processing storage 113 may represent any type of storage usable for any purpose within processor 110; for example, it may include any number of data registers, instruction registers, status registers, configuration registers, control registers, other programmable or hard-coded registers or register files, or any other storage structures.

Interface unit 114 may represent any circuitry, structure, or other hardware, such as a bus unit, messaging unit, or any other unit, port, or interface, to allow processor 110 to communicate with other components in system 100 through any type of bus, point to point, or other connection, directly or through any other component, such as a memory controller or a bus bridge.

Processor control unit 115 may include any logic, microcode, circuitry, or other hardware to control the operation of the units and other elements of processor 110 and the transfer of data within, into, and out of processor 110. Processor control unit 115 may cause processor 110 to perform or participate in the performance of method embodiments of the present invention, such as the method embodiments described below, for example, by causing processor 110 to execute instructions received by instruction unit 111 and micro-instructions or micro-operations derived from instructions received by instruction unit 111.

Cache unit 116 may represent any one or more levels of cache memory in a memory hierarchy of information processing system 100, implemented in static random access memory or any other memory technology. Cache unit 116 may include any combination of cache memories dedicated to or shared among any one or more execution cores or processors within processor 110 according to any known approaches to caching in information processing systems.

Secure enclave unit 117 may represent any logic, circuitry, hardware, or other structures for creating and maintaining a secured, protected, or isolated environment, such as a secure enclave as described herein, in which an application or other software may run, execute, be loaded, or otherwise be present within an information processing system such as system 100. For purposes of this description, each instance of such an environment may be referred to as a secure enclave, although embodiments of the present invention are not limited to those using a secure enclave as the secured, protected, or isolated environment. In one embodiment, a secure enclave may be created and maintained using instructions in the instruction set of a processor in the Intel® Core® Processor Family or other processor family from Intel® Corporation.

Figure 2:
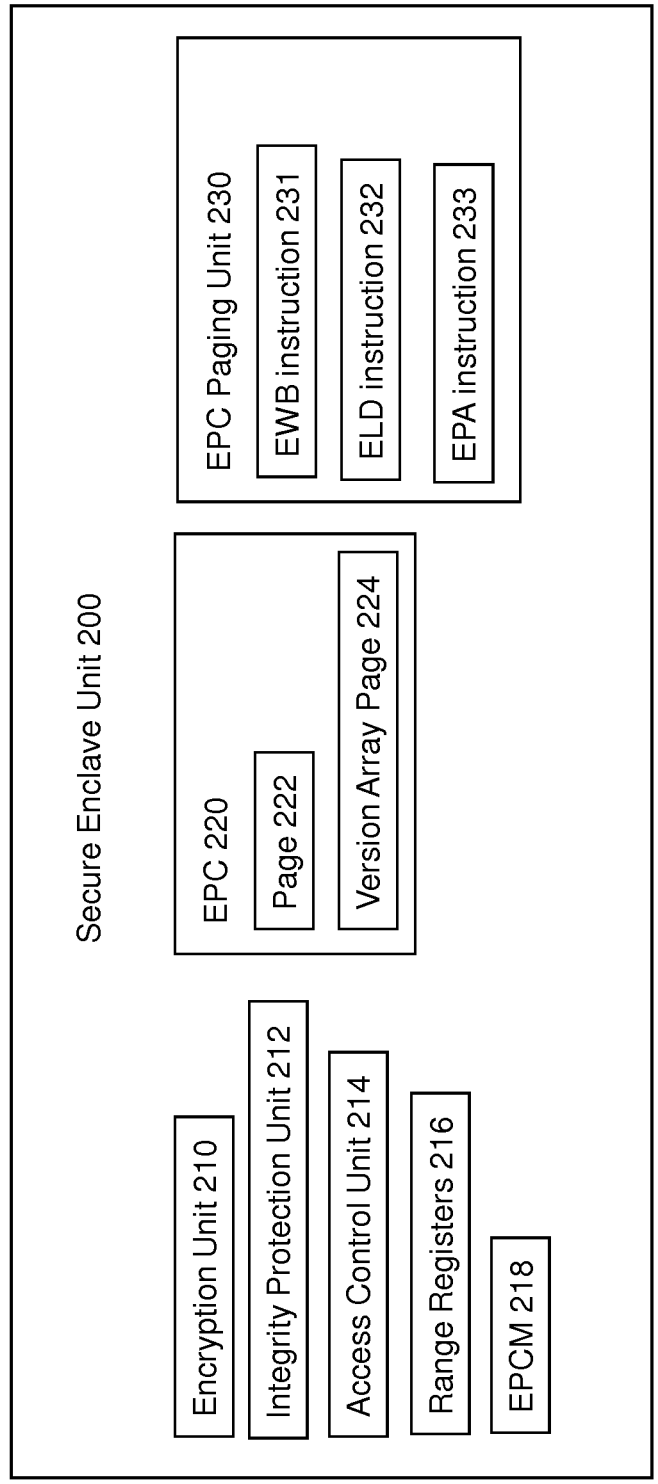
FIG. 2 illustrates a secure enclave unit according to an embodiment of the present invention.

FIG. 2 illustrates secure enclave unit 200, an embodiment of which may serve as secure enclave unit 117 in system 100. All or part of secure enclave unit 200 may be included within any one or more other units of processor 110, such as instruction unit 111, execution unit 112, processor storage 113, processor control unit 115, and cache unit 116.

Secure enclave unit 200 may include encryption unit 210, which may include any logic, circuitry, or other hardware to execute any one or more encryption algorithms and the corresponding decryption algorithms, and may include logic, circuitry, or other hardware shared with another encryption unit in processor 110. Secure enclave unit 200 may also include integrity protection unit 212, which may include any logic, circuitry, or other hardware to implement any approach to integrity and/or replay attack protection, such as by generating a monotonic counter value, a random number, an integrity check value, and/or any other metadata for data to be protected.

Secure enclave unit 200 may also include enclave page cache (EPC) 220. In one embodiment, EPC 220 may be a dedicated portion of cache unit 116, such as a portion of a last level cache. Other embodiments are possible, including embodiments in which all or part of EPC 220 may be outside of processor 110. EPC 220 may be used to store unencrypted code and data for one or more secure enclaves. Access control logic 214, range register(s) 216, and EPC map (EPCM) 218 may be used to prevent access to a page within EPC 220 except by an application running on processor 110 within the secure enclave to which the page is allocated.

Secure enclave unit 200 may also include EPC paging unit 230. EPC paging unit 230 may include any logic, circuitry, or other hardware to provide for moving pages out of and into EPC 220 according to embodiments of the present invention. EPC paging unit 230 may include microcode, logic, circuitry, and/or other hardware to decode and execute an EWB instruction 231, an ELD instruction 232, and an EPA instruction 233.

These instructions may be used by an operating system or other software to manage EPC 220 and provide a virtual memory space for use by one or more secure enclaves that is larger than the size of EPC 220. EWB instruction 231 may be used to evict a page, such as page 222, from EPC 220 to system memory 120. ELD instruction 232 may be used to load a page from system memory 120 into EPC 220. EPA instruction 233 may be used to allocate a special EPC page, such as version array page 224, on which to store version information for evicted pages.

The parameters for EWB instruction 231 may include a pointer to the EPC page to be paged out, a pointer to an empty slot in a version array page in which to store a version number of the page to be paged out, and pointers to memory locations outside of the EPC page in which to store the encrypted page, an integrity check value, secure enclave control structure (SECS) information, and any other metadata for the page. Any page in an EPC, including version array pages and SECS pages, may be paged out, except for a root version array page.

The parameters for ELD instruction 232 may include pointers to the encrypted page to be paged back in and its associated metadata, a pointer to a free page location in the EPC in which to load the page, a pointer to the SECS for the secure enclave to which the page is allocated, and a pointer to the slot in the version array page in which the version number of the page is stored.

FIG. 3 illustrates method 300 for paging in secure enclaves according to an embodiment of the present invention. Although method embodiments of the invention are not limited in this respect, reference may be made to elements of FIGS. 1 and 2 to help describe the method embodiment of FIG. 3.

In box 310, a secure enclave is created. In box 312, pages in EPC 220, including page 222, may be allocated to the secure enclave.

In box 320, execution of EPA instruction 233 begins. In box 322, a version array page (e.g., version array page 224) is created in EPC 130 to be used to store version information for evicted pages. More than one version array page may be created within the scope of the present invention, and version array pages may also be paged out so long as the version information for an evicted version array page is stored in another version array page that is present in EPC 220, and so long as any version array page that is paged out is paged back in before paging back in any page whose version information is stored in that version array page. Any page layout and/or type of data structure may be used for storing version numbers and/or other information in version array pages and creating a hierarchy of version array pages.

In box 340, execution of EWB instruction 231 begins. In box 342, the contents of the page to be evicted from EPC 220 (e.g., page 222) are encrypted by encryption unit 210 to generate an encrypted page. Any encryption algorithm or technique may be used within the scope of the present invention. In box 344, an integrity check value, an anti-replay value, and/or other metadata are generated for the page and/or the encrypted page by integrity protection unit 212. Any approach to integrity checking, anti-replay protection, and/or other verification or authentication may be used within the scope of the present invention. In box 346, a unique version number for the page is stored in a slot in a version array page (e.g., version array page 224). In box 348, the encrypted page, the metadata, and the EPCM information for the page are written to system memory 120.

In box 350, the page location freed by the eviction of page 222 may be used by the same secure enclave or by a different secure enclave.

In box 360, execution of ELD instruction 232 begins. In box 362, the encrypted contents of the page to be reloaded into EPC 220 (e.g., page 222) are decrypted by encryption unit 210. In box 364, an integrity check value, an anti-replay value, and/or other metadata for the page are checked by integrity protection unit 212 to verify the integrity of the page, including checking that the version is the same version that was last written out. If verification passes, method 300 continues in box 366. If not, method 300 ends after optionally signaling an error or fault.

In box 366, the unencrypted page is reloaded into EPC 220 and the EPCM information is restored to EPCM 218.

In various embodiments of the present invention, the method illustrated in FIG. 3 may be performed in a different order, with illustrated boxes combined or omitted, with additional boxes added, or with a combination of reordered, combined, omitted, or additional boxes. Furthermore, many other method embodiments are possible within the scope of the present invention.

Embodiments or portions of embodiments of the present invention, as described above, may be stored on any form of a machine-readable medium. For example, all or part of method 300 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for paging in secure enclaves have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
an instruction unit to receive a first instruction; and
an execution unit to execute the first instruction, wherein execution of the first instruction includes evicting a first page from an enclave page cache and execution of the third instruction includes allocating a second page in the enclave page cache to be a version array page in which to store a version number of the first page in connection with execution of the first instruction.

2. The processor of claim 1, wherein execution of the first instruction also includes encrypting the contents of the first page to generate an encrypted page.

3. The processor of claim 1, wherein execution of the first instruction also includes storing the encrypted page in a memory.

4. The processor of claim 3, wherein execution of the first instruction also includes storing integrity check metadata for the encrypted page in the memory.

5. The processor of claim 4, wherein the instruction unit is also to receive a second instruction and the execution unit is also to execute the second instruction, wherein execution of the second instruction includes reloading the first page into the enclave page cache.

6. The processor of claim 5, wherein execution of the second instruction also includes decrypting the encrypted page.

7. The processor of claim 6, wherein execution of the second instruction also includes verifying the version number.

8. A method comprising:
receiving a third instruction;
in response to receiving the third instruction, allocating a second page in the enclave page cache to be a version array page in which to store a plurality of version numbers, each of the plurality of version numbers corresponding to a page evicted from an enclave page cache;
receiving a first instruction; and
in response to receiving the first instruction, evicting a first page from the enclave page cache and storing a version number of the first page in the version array page.

9. The method of claim 8, further comprising, in response to receiving the first instruction, encrypting the contents of the first page to generate an encrypted page.

10. The method of claim 8, further comprising, in response to receiving the first instruction, storing the encrypted page in a memory.

11. The method of claim 10, further comprising, in response to receiving the first instruction, storing integrity check metadata for the encrypted page in the memory.

12. The method of claim 11, further comprising:
receiving a second instruction; and
in response to receiving the second instruction, reloading the first page into the enclave page cache.

13. The method of claim 12, further comprising, in response to receiving the second instruction, decrypting the encrypted page.

14. The method of claim 13, further comprising, in response to receiving the second instruction, verifying the version number.

15. A system comprising:
a memory; and
a processor including
an instruction unit to receive a first instruction and a third instruction; and
an execution unit to execute the first instruction and the third instruction, wherein execution of the first instruction includes evicting a first page from an enclave page cache and execution of the third instruction includes allocating a second page in the enclave page cache to be a version array page in which to store a version number of the first page in connection with execution of the first instruction.

16. The system of claim 15, wherein execution of the instruction also includes encrypting the contents of the page to generate an encrypted page and storing the encrypted page in the memory.

* * * * *